(12) United States Patent
Min et al.

(10) Patent No.: US 9,545,899 B2
(45) Date of Patent: Jan. 17, 2017

(54) REPLACEABLE SWITCH APPARATUS FOR VEHICLE

(71) Applicants: Hyundai Motor Company, Seoul (KR); Kia Motors Corporation, Seoul (KR); Dong Hee Industrial Co., Ltd., Ulsan (KR)

(72) Inventors: Jeong Seon Min, Gwangju (KR); Yang Rae Cho, Gyeonggi-do (KR); Chang Hyun Lee, Seoul (KR); Young Je Park, Gyeonggi-do (KR); Eun Sik Kim, Gyeonggi-do (KR); Dong Hwan Kim, Ulsan (KR)

(73) Assignees: Hyundai Motor Company, Seoul (KR); Kia Motors Corporation, Seoul (KR); Dong Hee Industrial Co., Ltd., Ulsan (KR)

( * ) Notice: Subject to any disclaimer, the term of this patent is extended or adjusted under 35 U.S.C. 154(b) by 636 days.

(21) Appl. No.: 13/796,131

(22) Filed: Mar. 12, 2013

(65) Prior Publication Data

US 2014/0183013 A1   Jul. 3, 2014

(30) Foreign Application Priority Data

Dec. 28, 2012 (KR) .................. 10-2012-0156294

(51) Int. Cl.
| | |
|---|---|
| *H01H 51/22* | (2006.01) |
| *B60T 7/04* | (2006.01) |
| *H01H 13/16* | (2006.01) |

(52) U.S. Cl.
CPC ............... *B60T 7/042* (2013.01); *H01H 13/16* (2013.01)

(58) Field of Classification Search
CPC ........... H01H 9/00; H01H 13/16; H01H 1/66; H01H 51/29; H01H 50/023; B60T 7/042
See application file for complete search history.

(56) References Cited

U.S. PATENT DOCUMENTS

| | | | |
|---|---|---|---|
| 1,750,902 A * | 3/1930 | Obergfell | ...................... 335/265 |
| 4,675,776 A * | 6/1987 | Howell | ............................ 361/92 |
| 6,265,955 B1 * | 7/2001 | Molyneux | ................ H01H 1/66 200/304 |
| 7,990,240 B2 * | 8/2011 | Bush | .................... H01H 50/023 335/132 |

FOREIGN PATENT DOCUMENTS

| | | |
|---|---|---|
| KR | 10-2009-0044198 A | 5/2009 |
| KR | 10-2009-0054359 | 5/2009 |
| KR | 10-2009-0054359 A | 5/2009 |
| KR | 10-2009-0095047 A | 9/2009 |
| KR | 10-2010-0136147 A | 12/2010 |

* cited by examiner

*Primary Examiner* — Bernard Rojas
(74) *Attorney, Agent, or Firm* — Mintz Levin Cohn Ferris Glovsky and Popeo, P.C.; Peter F. Corless

(57) ABSTRACT

Disclosed is a switch apparatus of a vehicle that includes a switch body that is connected to a connector of an electronic apparatus and includes a relay board disposed in an inner space thereof. The apparatus further includes a coupling portion disposed on a bottom of the switch body, formed by a conductor, and coupled to a fixation bracket. Additionally, an earth member includes a base formed by the conductor and is disposed in a lower part of the inner space of the switch body, and coupled on the top of the coupling portion and a clamping bar respectively extended upward at both sides of the base and coupled with an earth terminal formed on the bottom of the relay board.

12 Claims, 9 Drawing Sheets

REPLACEABLE SWITCH APPARATUS FOR VEHICLE

CROSS-REFERENCE TO RELATED APPLICATION

This application claims under 35 U.S.C. §119(a) the benefit of Korean Patent Application No. 10-2012-0156294 filed on Dec. 28, 2012, the entire contents of which are incorporated herein by reference.

BACKGROUND (a) Technical Field

The present invention relates to a switch mounted at a location where an on/off control of a vehicle is disposed, and more particularly, to a switch apparatus for a vehicle to which a relay that applies current to a switch is coupled.

(b) Background Art

When a switch apparatus mounted on a vehicle operates as a user intends with respect to the vehicle and an operation of a predetermined level is sensed, a switch operates to perform a series of operations. When the user engages a brake pedal to stop the vehicle by using a stop lamp switch mounted on a brake as an example, the stop lamp switch mounted on the brake pedal operates, and a result, the stop lamp is turned on. However when overcurrent at a predetermined level flows in a conventional switch, a contact of the stop lamp switch is burnt.

A relay is mounted on a junction box to prevent overcurrent from flowing on the switch, and thus it may be difficult to replace parts. In particular, when overcurrent flows on the switch in a vehicle before the relay is adopted, the switch may need to be replaced on multiple occasions.

FIG. 1 is an exemplary diagram illustrating a part of a switch apparatus according to the prior art, wherein a connection line bundle acquired by binding as one a connection line 11 connected with a connector side and a connection line 20 connected to a fixation bracket side, and a connection line 13 connected to a relay side and a connection line 40 connected to an earth side of the vehicle.

In the prior art, the relay is mounted on the switch, however, the hall sensor, a magnet, and an integrated circuit (IC), and the like are required in a method of measuring a distance from the brake pedal by using the hall sensor. Thus, manufacturing costs may increase and malfunction may occur due to a sensitive sensor.

The description provided above as a related art of the present invention is just for helping understanding the background of the present invention and should not be construed as being included in the related art known by those skilled in the art.

SUMMARY

The present invention provides a switch apparatus for a vehicle which includes a switch and a relay which are integrally formed, and an earth line mounted to a vehicle body.

In one aspect of the present invention, a switch apparatus of a vehicle, may include: a switch body connected with a connector of an electronic apparatus, wherein the switch body includes a relay board disposed in an inner space thereof; a coupling portion disposed on a bottom of the switch body, formed by a conductor, and coupled to a fixation bracket; and an earth member including a base formed by the conductor, disposed in a lower part of the inner space of the switch body, and coupled on a top of the coupling portion and a clamping bar respectively extended upward at both sides of the base and coupled with an earth terminal formed on a bottom of the relay board.

A plurality of connection lines electrically connecting the connector and the relay board may be embedded in the switch body. A fitting protrusion may protrude at a lower side of the relay board and a coil portion may fit in and be coupled to the fitting protrusion by the fitting protrusion.

An extension portion which is extended downward at lower left and right ends of the relay board may be disposed in the relay board and the earth terminal may be disposed in the extension portion and the earth terminal may be coupled by the clamping bar of the earth member to form an earth circuit.

An aperture may be formed on the bottom of the switch body, and while the coupling portion is coupled to the aperture, a base having a rod aperture with a diameter smaller than the aperture formed on the bottom of the switch body, may be formed in the switch body and may be fixed onto the bottom of the switch body.

A sliding aperture may be vertically formed in the coupling portion, and while an operating rod configured to slide vertically by elastic force of an elastic body may be disposed in the sliding aperture, an upper side of the operating rod may be disposed in the switch body.

The operating rod may include a bar shaped rod bar which is vertically extended and an elastic body surrounding the rod bar on an outer surface and a flange shaped flange portion surrounding a circumference of the rod bar may be formed at the center of the rod bar. Furthermore, an upper side of the elastic body may be supported by the base and a lower side of the elastic body may be supported by the flange portion to prevent separation of the parts. A suspension portion of which one end is narrowed may be formed in the sliding aperture of the coupling portion and the flange portion of the operating rod may be suspended to a suspension portion, and as a result, the operating rod may be not separated in a downward direction.

A hook shaped hook portion may be disposed in the switch body and formed on the top of the operating rod and a disk like coupler may be configured to penetrate and be coupled to the hook portion, and as a result, a switch may operate by a change in distance between the coil portion and coupler. A lower end of the operating rod may be extended to pass through the coupling portion and contact an operating portion of the vehicle.

The clamping bar of the earth member may elastically support the extension portion of the relay board, and a groove may be disposed on the relay board to form a fixation groove at a location of the extension portion of the relay board and the clamping bar, and the clamping bar may be fixed and supported to the fixation groove.

The coupling portion may penetrate and be coupled to the bracket aperture disposed at the center of the fixation bracket of a vehicle body, and coupled and fixed to an upper nut and a lower nut around the fixation bracket. A round portion which protrudes in a disk shape may be disposed inside the bottom of the upper nut and may be coupled according to the shape of the bracket aperture of the fixation bracket.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
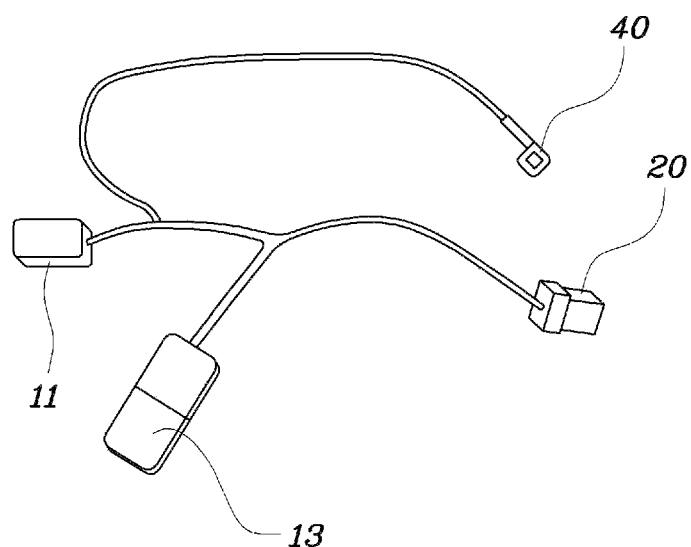
FIG. 1 is an exemplary diagram illustrating parts of a switch apparatus according to the prior art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

Figure 2:
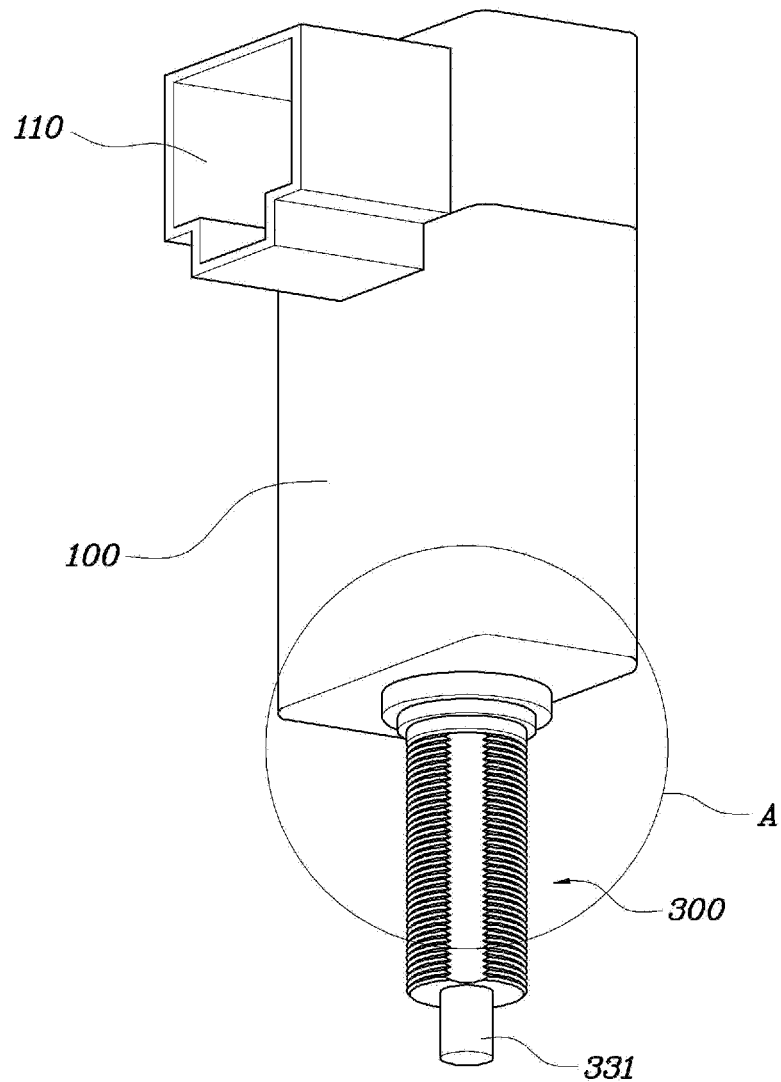
FIG. 2 is an exemplary diagram illustrating a switch apparatus of a vehicle according to an exemplary embodiment of the present invention.
Figure 3:
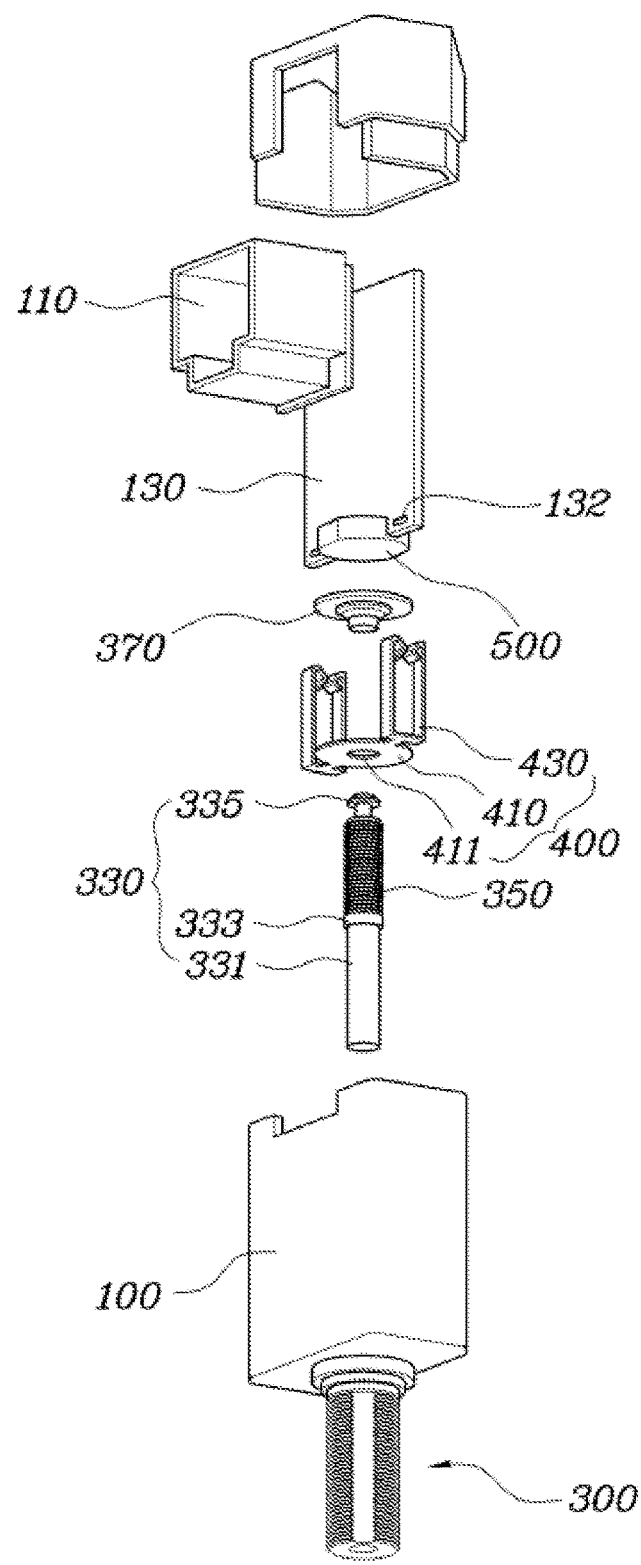
FIG. 3 is an exemplary detailed view of FIG. 2 according to an exemplary embodiment of the present invention.
Figure 4:
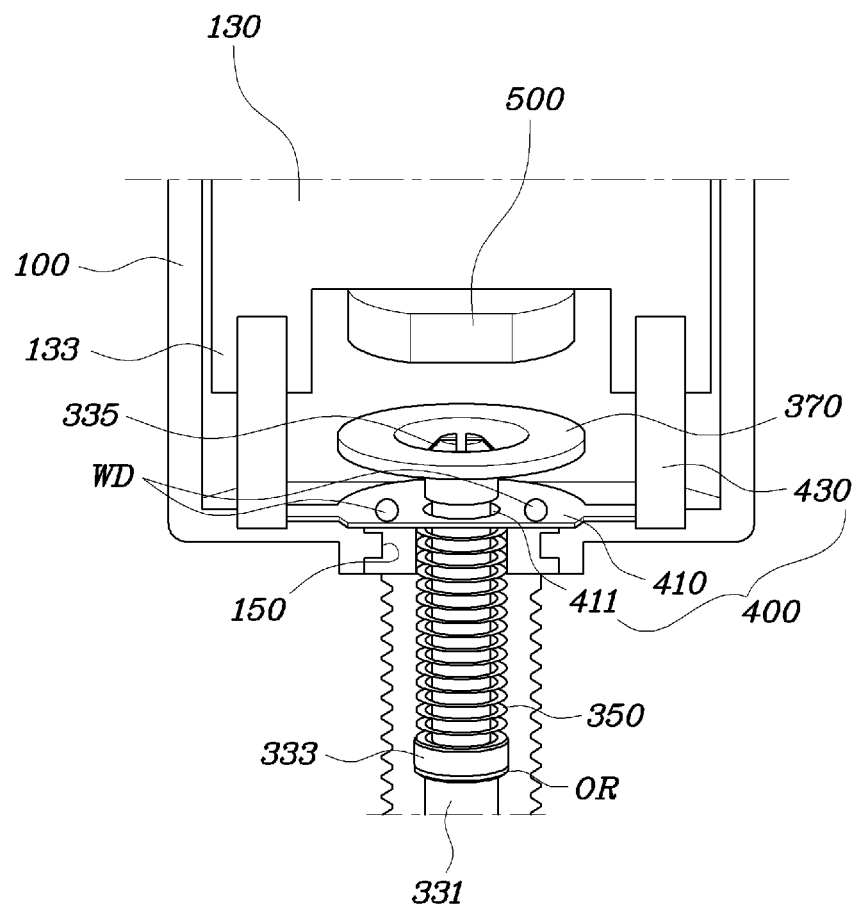
FIG. 4 is an exemplary cross-sectional view of part A of FIG. 2 according to an exemplary embodiment of the present invention.
Figure 5:
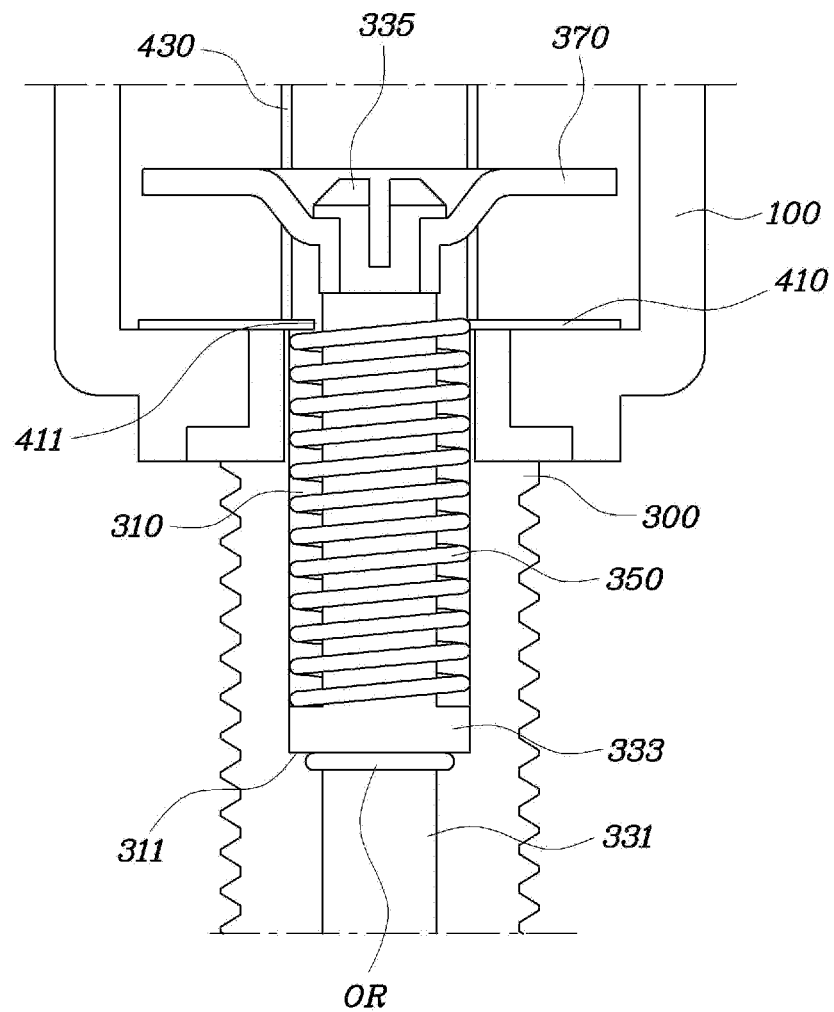
FIG. 5 is an exemplary side view of FIG. 4 according to an exemplary embodiment of the present invention.
Figure 6:
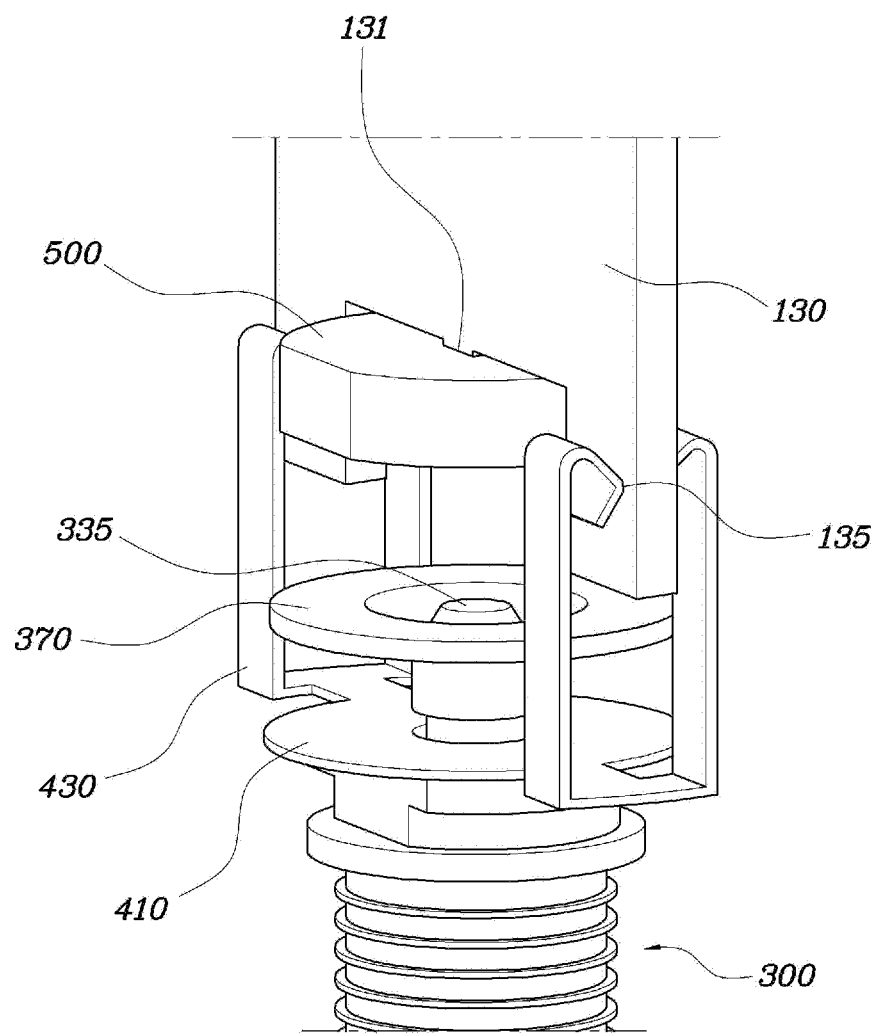
FIG. 6 is an exemplary diagram illustrating an inner side of part A of FIG. 2 according to an exemplary embodiment of the present invention.

FIGS. 2 to 6 are exemplary diagrams illustrating a switch of a vehicle according to an exemplary embodiment of the present invention. FIG. 2 is an exemplary diagram illustrating the switch apparatus of a vehicle, FIG. 3 is an exemplary detailed view of FIG. 2, FIG. 4 is an exemplary cross-sectional view of part A of FIG. 2, FIG. 5 is an exemplary side view of FIG. 4, and FIG. 6 is an exemplary diagram illustrating an inner side of part A of FIG. 2.

A switch apparatus according to an exemplary embodiment of the present invention may include: a switch body 100 connected to a connector 110 of an electronic apparatus wherein the switch body 100 includes a relay board 130 disposed in an inner space thereof; a coupling portion 300 disposed on a bottom of the switch body 100, formed by a conductor, and coupled to a fixation bracket 200; and an earth member 400 including a base 410 formed by the conductor, disposed in a lower part of the inner space of the switch body 100, and coupled on a top of the coupling portion 300 and a clamping bar 430 respectively extended upward at both sides of the base 410 and coupled with an earth terminal 132 formed on a bottom of the relay board 130.

A plurality of connection lines electrically connecting the connector 110 and the relay board 130 may be embedded in the switch body 100. A fitting protrusion 131 may protrude at a lower side of the relay board 130 and a coil portion 500 may fit in and may be coupled to the fitting protrusion 131. The fitting protrusion 131 may be formed at a center of the relay board 130, and an extension portion 133 which is extended downward at left and right ends may be disposed at both ends of the fitting protrusion 131, that is, lower left and right ends of the relay board 130. An earth terminal may be disposed at the extension portion 133.

The earth member 400 may include a disk like base 410 on the bottom of the switch body 100 and a clamping bar 430 which is extended to both sides of the base 410 and then in an upward direction. A rod aperture 411 may be formed in a round shape at the center of the base 410 and the clamping bar 430 having a bar shape. Alternatively, an end of the clamping bar 430 may be bent inward and two clamping bars 430 may be used to support the relay board 130 in forward and backward directions.

The clamping bar 430 may be formed to generate elastic force in a shrinkage direction to elastically support the extension portion 133 of the relay board 130. A fixation groove 135 which fits in a bent portion of the clamping bar 430 may be formed at the extension portion 133 of the relay board 130 to prevent the clamping bar from sliding at a location corresponding to the bent portion of the clamping bar 430, and as a result, the bent portion of the clamping bar 430 may fit in and be coupled to the fixation groove 135 to increase the support. Therefore, the relay board 130 may not be separated from the clamping bar 430 due to vibration of the vehicle, and the like.

Since the earth terminal 132 of the extension portion 133 of the relay board 130 may be coupled by the clamping bar 430 of the earth member 400, the earth terminal 132 may be linked from the connector 110 to the relay board 130, the earth member 400, and the coupling portion 300, and as a result, an earth circuit mounted to a vehicle body may be formed.

An aperture 150 may be formed on a bottom of the switch body 100 and the coupling portion 300 may be fixed to the aperture 150 by methods such as press-fit and injection, and the like. The coupling portion 300 may have a cylinder shape, and a sliding aperture 310 which is penetrated vertically may be formed. A suspension portion 311 of which one end may be narrower than the other end may be formed at a lower portion thereof and an outer surface may have a bolt shape in which a thread may be formed. Additionally, the thread may be formed throughout an outer peripheral surface but only partially on the outer peripheral surface and a part in which the thread is not formed may have a plane shape, and as a result, an elliptical shape formed in an arc shape may be formed, in which two substantially linear lines of which ends are parallel to each other in a longitudinal direction and ends of two substantially linear lines are linked to each other, respectively.

A operating rod 330 which elongates vertically may be disposed in the sliding aperture 310 and the operating rod 330 may have a bar shaped rod bar 331 which may be vertically extended. A hook-shaped hook portion 335 may be formed on the top of the operating rod 330 and the hook portion 335 may penetrate the aperture 150 of the switch body 100 and the rod hole 411 formed at the center of the base 410 of the earth member 400.

The top of the base 410 and the coupling portion 300 may be coupled to each other by welding (WD), and as a result, the earth circuit may be substantially continuously extended to increase the strength of the fixed portion.

Therefore, an upper hook portion 335 of the operating rod 330 may penetrate the rod aperture 411 to be disposed at the inside of the switch body 100 and a coupler 370 having a disk shape, may fit in and be coupled to a center of the hook portion 335. The coupler 370 may be disposed to vertically move within a predetermined distance at a lower side spaced apart from a coil portion 350 by a predetermined distance.

A flange-shaped flange portion 333 which surrounds the circumference of the rod bar 331 may be formed at the center of the rod bar 331 and the flange portion 333 may be disposed to be suspended on the suspension portion 311 of the sliding aperture 310 to prevent the operating rod 330 from being separated downward in the sliding aperture 310.

An elastic body 350 which surrounds the rod bar 331 on an outer surface may be coupled to a lower side of the base 410 of the earth member 400 and an upper side of the flange portion 333 of the rod bar 331. Since the rod aperture 411 may be smaller than the aperture 150 of the switch body, the elastic body 350 of the coupling portion 300 may not be separated in an upward direction. An upper side of the elastic body 350 may be supported by the base 410 and a lower side of the elastic body 350 may be supported by the flange portion 333, and as a result, the elastic body 350 may not be separated vertically but may operate by vertically moving the operating rod 330 by elastic force of the elastic body 350.

The operating rod 330 of which a lower end is extended may contact an operating unit of a vehicle through the bottom of the coupling portion 300, and as a result, a switch may operate by a distance change of the coupler 370 coupled to the upper hook portion 335 of the operating rod and the coil portion 500 which fits in and is coupled to a lower fitting protrusion 131 of the relay board 130 according to operation of the operating rod 330. An O-ring ("OR") may be coupled to the lower side of the flange portion 333 of the operating rod 330 to prevent foreign materials such as moisture, and the like from flowing into the switch apparatus from the exterior.

The switch apparatus of the present invention may be used as a switch apparatus in which the relays are coupled to all switch apparatuses of the vehicle, but when a stop lamp switch of a brake pedal is described as an example according to an embodiment of the present invention, a spring bracket welded to the brake pedal may be coupled with a switch bracket coupled to the switch apparatus through a tension spring and a lower end portion of the operating rod may contact a contact plate mounted on the spring bracket.

When a brake pedal is engaged, the welded spring bracket may move and the contact plate of the spring bracket may be separated, and as a result, the operating rod which contacts the contact plate may gradually protrude to the exterior of the switch apparatus. A space may be formed between the coupler and the coil portion connected to the top of the operating rod as the operating rod protrudes. Furthermore, when the intensity of an electromagnetic wave is changed by interaction of eddy current generated on the surface of metal and an existing electromagnetic wave and thus the intensity of the electromagnetic wave is equal to or more than a predetermined level, the switch apparatus may be turned on and the stop lamp may be turned on by determining an engagement of the brake pedal.

According to the switch apparatus of the embodiment of the present invention, the relay may be integrally formed on the switch apparatus, thus eliminating separately mounted parts and as a result, a manufacturing cost may decrease.

Figure 7:
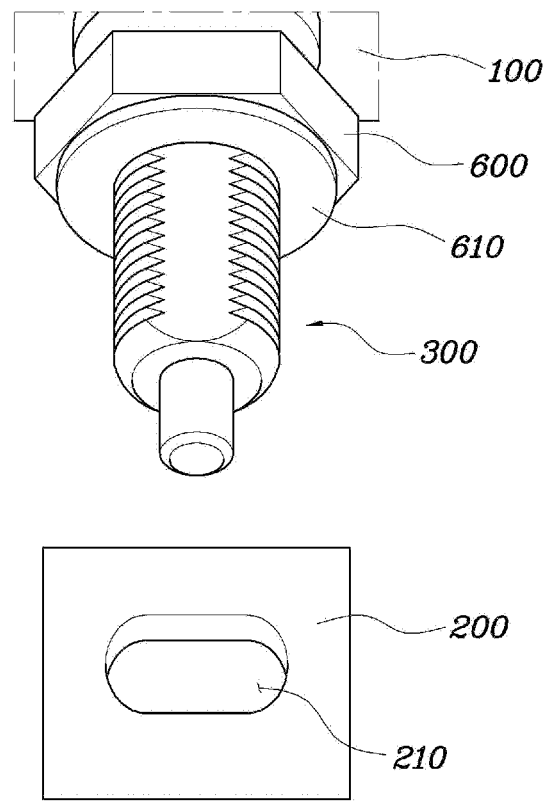
FIG. 7 is an exemplary diagram illustrating the switch apparatus before being fixed to a fixation bracket with an elliptical aperture according to an exemplary embodiment of the present invention.
Figure 8:
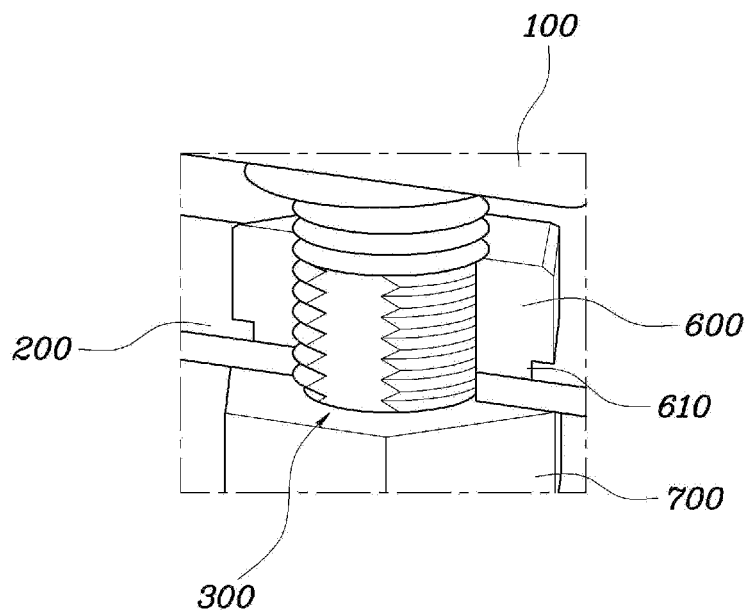
FIG. 8 is an exemplary diagram illustrating a coupled switch apparatus of FIG. 7 according to an exemplary embodiment of the present invention.
Figure 9:
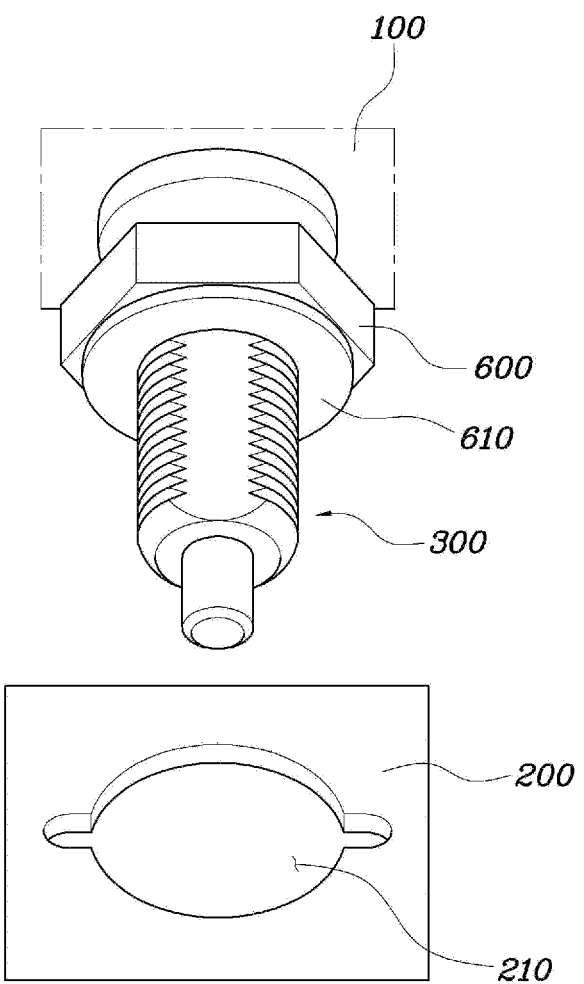
FIG. 9 is an exemplary diagram illustrating the switch apparatus before being fixed to a fixation bracket with a round aperture according to an exemplary embodiment of the present invention.
Figure 10:
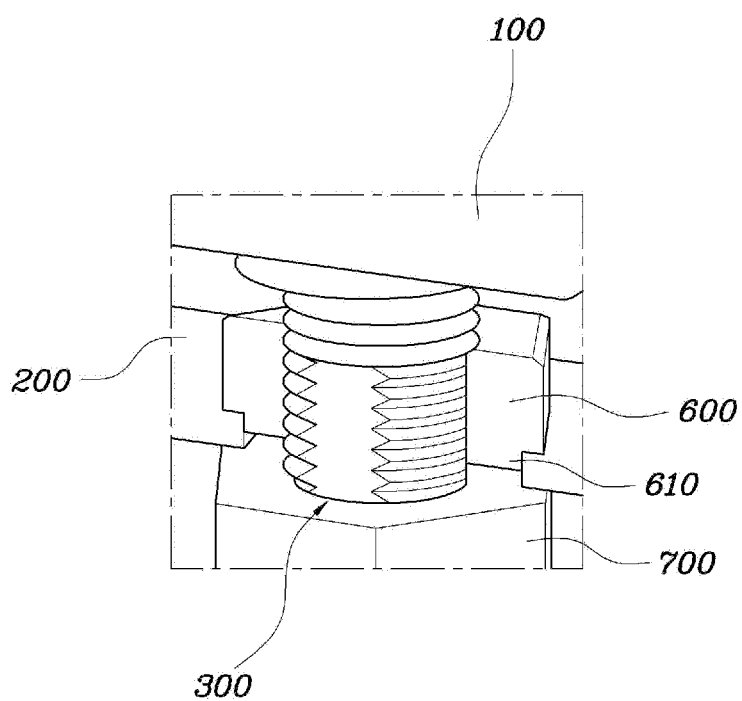
FIG. 10 is an exemplary diagram illustrating a coupled switch apparatus of FIG. 9 according to an exemplary embodiment of the present invention.

FIGS. 7 to 10 are exemplary diagrams illustrating a shape in which a switch apparatus may be coupled in accordance with a shape of a bracket aperture 210, and FIGS. 7 and 8 are exemplary diagrams illustrating the switch apparatus coupled to a fixation bracket 200 when the bracket aperture 210 has an elliptical shape and FIG. 9 is an exemplary diagram illustrating the coupled switch apparatus when the bracket aperture 210 formed in the fixation bracket 200 is a round shape.

The coupling portion 300 may penetrate and be coupled to the bracket aperture 210 disposed at the center of the fixation bracket 200 of a vehicle body, and may be coupled and fixed to an upper nut 600 and a lower nut 700 around the fixation bracket 200. The bracket aperture 210 of the fixation bracket 200 may be formed to couple the switch apparatus to prevent malfunction as the switch apparatus is separated due to vibration generated when the vehicle travels and the bracket aperture 210 has an elliptical shape or a round shape.

The coupling portion 300 of the switch apparatus may have a bolt shape of which both sides have a flat shape and a cross section of the coupling portion 300 has an elliptical shape, and as a result, while the cross section having the elliptical shape contacts the bottom of the upper nut 600 without an additional device, the coupling portion 300 may fit in and be coupled to the bracket aperture 210 to increase the support (illustrated in FIGS. 7 and 8).

Moreover, since the coupling portion 300 has an elliptical shape when the bracket aperture 210 has a round shape, the bracket aperture 210 may have a larger diameter than the coupling portion 300. Therefore, the bracket aperture 210 and the coupling portion 300 may not be coupled to each other. While the upper nut 600 may be fixed to the upper side of the fixation bracket 200 for substantially smooth coupling, a round portion 610 which protrudes in a disk shape may be disposed inside the bottom of the upper nut 600 and the round portion 610 may fit in and be coupled to the round bracket aperture 210 to increase the support to the coupling portion 300.

As an earth circuit is completed through the inside of the switch apparatus from the earth terminal, a part that connects conventionally used connection lines may not be used even when the switch apparatus is mounted or replaced while the switch has an earth function and a relay function. In other words, only the switch may be mounted or replaced to increase operation efficiency and since a bolt may be added to fix the switch apparatus to a fixation bracket having various shapes regardless of a vehicle model, the switch apparatus may be applied to all vehicles models without additionally changing a design.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A switch apparatus for a vehicle, comprising:
   a switch body connected to a connector of an electronic apparatus, wherein the switch body includes a relay board disposed in an inner space thereof;
   a coupling portion disposed on a bottom of the switch body, formed as a conductor, and coupled to a fixation bracket; and
   an earth member including a base formed of a conductor material, disposed in a lower part of the inner space of the switch body, and coupled on a top of the coupling portion; and a clamping bar respectively extended upward from opposing sides of the base and coupled with an earth terminal formed on an extension portion disposed in the bottom of the relay board,
   wherein the coupling portion penetrates and is coupled to a bracket aperture disposed at the center of the fixation bracket of a vehicle body, and is fixed to an upper nut and a lower nut around the fixation bracket.

2. The switch body of a vehicle of claim 1, further comprising:
   a fitting protrusion that protrudes at a lower side of the relay board and a coil portion is coupled to the fitting protrusion.

3. The switch body of a vehicle of claim 1, wherein the extension portion that extends in a downward direction at lower left and right ends of the relay board is disposed in the relay board, and wherein the earth terminal is disposed in the extension portion and is coupled by the clamping bar of the earth member to form an earth circuit.

4. The switch body of a vehicle of claim 1, further comprising:
   an aperture formed on the bottom of the switch body, wherein the coupling portion is coupled to the aperture to form a base including a rod aperture having a diameter smaller than the aperture.

5. The switch body of a vehicle of claim 1, further comprising:
   a sliding aperture vertically formed in the coupling portion, wherein an operating rod which slides vertically by elastic force of an elastic body is disposed in the sliding aperture and an upper side of the operating rod is disposed in the switch body.

6. The switch body of a vehicle of claim 5, wherein the operating rod includes:
   a bar-shaped rod bar vertically extended;
   an elastic body surrounding the rod bar on an outer surface; and
   a flange shaped flange portion surrounding a circumference of the rod bar, wherein the flange portion is formed at the center of the rod bar.

7. The switch body of a vehicle of claim 6, wherein an upper side of the elastic body is supported by the base and a lower side of the elastic body is supported by the flange portion to prevent separation.

8. The switch body of a vehicle of claim 6, wherein
   a suspension portion is formed in the sliding aperture of the coupling portion and the flange portion of the operating rod is suspended to a suspension portion.

9. The switch body of a vehicle of claim 5, further comprising:
   a hook shaped hook portion disposed in the switch body and formed on the top of the operating rod; and
   a disk like coupler that penetrates and is coupled to the hook portion.

10. The switch body of a vehicle of claim 5, wherein a lower end of the operating rod is extended to pass through the coupling portion and contact an operating portion of the vehicle.

11. The switch body of a vehicle of claim 1, wherein the clamping bar of the earth member elastically supports the extension portion of the relay board, and a groove is disposed on the relay board to form a fixation groove at a location where the relay board and the clamping bar extend, and wherein the clamping bar is fixed and supported to the fixation groove.

12. The switch body of a vehicle of claim 1, further comprising:
   a round portion that protrudes in a disk shape is disposed inside a bottom of the upper nut and is coupled according to the shape of the bracket aperture of the fixation bracket.

* * * * *